United States Patent
Soderlind et al.

(10) Patent No.: US 10,913,482 B2
(45) Date of Patent: Feb. 9, 2021

(54) STEERING COLUMN ASSEMBLY

(71) Applicant: Ford Global Technologies, LLC, Dearborn, MI (US)

(72) Inventors: Erik William Soderlind, Harrison Twp., MI (US); Alan Joseph Porter, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 16/246,685

(22) Filed: Jan. 14, 2019

(65) Prior Publication Data
US 2020/0223473 A1 Jul. 16, 2020

(51) Int. Cl.
*B62D 1/185* (2006.01)
*B62D 1/10* (2006.01)
*F16D 3/06* (2006.01)

(52) U.S. Cl.
CPC .............. *B62D 1/185* (2013.01); *B62D 1/10* (2013.01); *F16D 3/06* (2013.01)

(58) Field of Classification Search
CPC .......... B62D 1/185; B62D 1/10; B62D 1/183; B62D 1/181; F16D 3/06
USPC ........................................................ 74/493
See application file for complete search history.

(56) References Cited

U.S. PATENT DOCUMENTS

| | | | |
|---|---|---|---|
| 3,753,471 A * | 8/1973 | Kammerer, Jr. | B63B 21/26 175/320 |
| 5,525,112 A | 6/1996 | Smith | |
| 5,716,276 A * | 2/1998 | Mangas | F16D 3/845 464/16 |
| 6,557,433 B1 * | 5/2003 | Castellon | B62D 1/185 403/359.1 |
| 9,919,727 B2 * | 3/2018 | Jager | B62D 1/16 |
| 2006/0131864 A1 * | 6/2006 | Riefe | B62D 1/185 280/775 |
| 2011/0049854 A1 | 3/2011 | Mencarelli | |
| 2011/0219907 A1 * | 9/2011 | Rietzler | F16C 33/208 74/493 |
| 2012/0160051 A1 * | 6/2012 | Walser | F16D 1/072 74/492 |
| 2014/0041194 A1 * | 2/2014 | Kurokawa | B62D 1/185 29/434 |
| 2017/0356487 A1 * | 12/2017 | Muntener | F16D 3/065 |
| 2019/0276069 A1 * | 9/2019 | Sekiguchi | B62D 1/185 |
| 2020/0108865 A1 * | 4/2020 | Park | F16D 3/06 |

FOREIGN PATENT DOCUMENTS

| | | |
|---|---|---|
| CN | 204279617 A | 4/2015 |
| CN | 205745313 U | 11/2016 |
| CN | 106218701 A | 12/2016 |
| CN | 107444464 A | 12/2017 |

* cited by examiner

*Primary Examiner* — James A English
*Assistant Examiner* — Kurtis Nielson
(74) *Attorney, Agent, or Firm* — Ray Coppiellie; Bejin Bieneman PLC

(57) ABSTRACT

A steering column assembly includes a first shaft and a second shaft telescopically engaged with the first shaft. The steering column assembly includes a bore extending through the first shaft to the second shaft. A plug is disposed in and occludes the bore. The plug is resiliently expandable relative to the first shaft.

16 Claims, 5 Drawing Sheets

STEERING COLUMN ASSEMBLY

BACKGROUND

A steering system for a vehicle controls a steering angle of wheels of the vehicle. The steering system assists in moving the wheels in response to an operator input to a steering wheel of the vehicle. The steering system may include a telescopic steering column having a lower shaft and an upper shaft that telescope relative to each other. As one example, the lower shaft and the upper shaft may be splined to allow for telescopic movement. The steering wheel is mounted to the upper shaft and the upper shaft and lower shaft telescope relative to each other to adjust the position of the steering wheel relative to an occupant of the vehicle.

DETAILED DESCRIPTION

Figure 1:
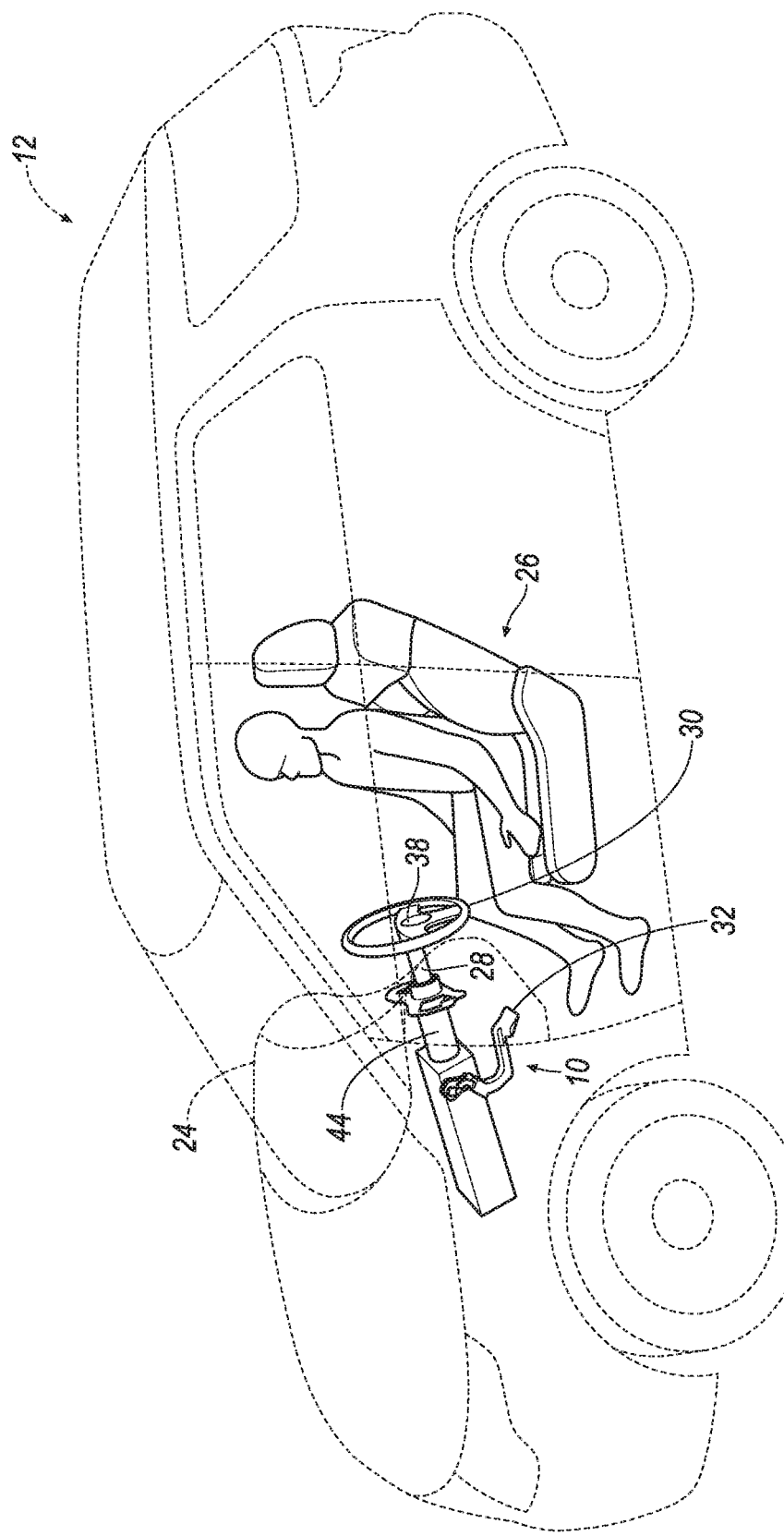
FIG. 1 is a perspective view of a vehicle including a steering column assembly.
Figure 2:
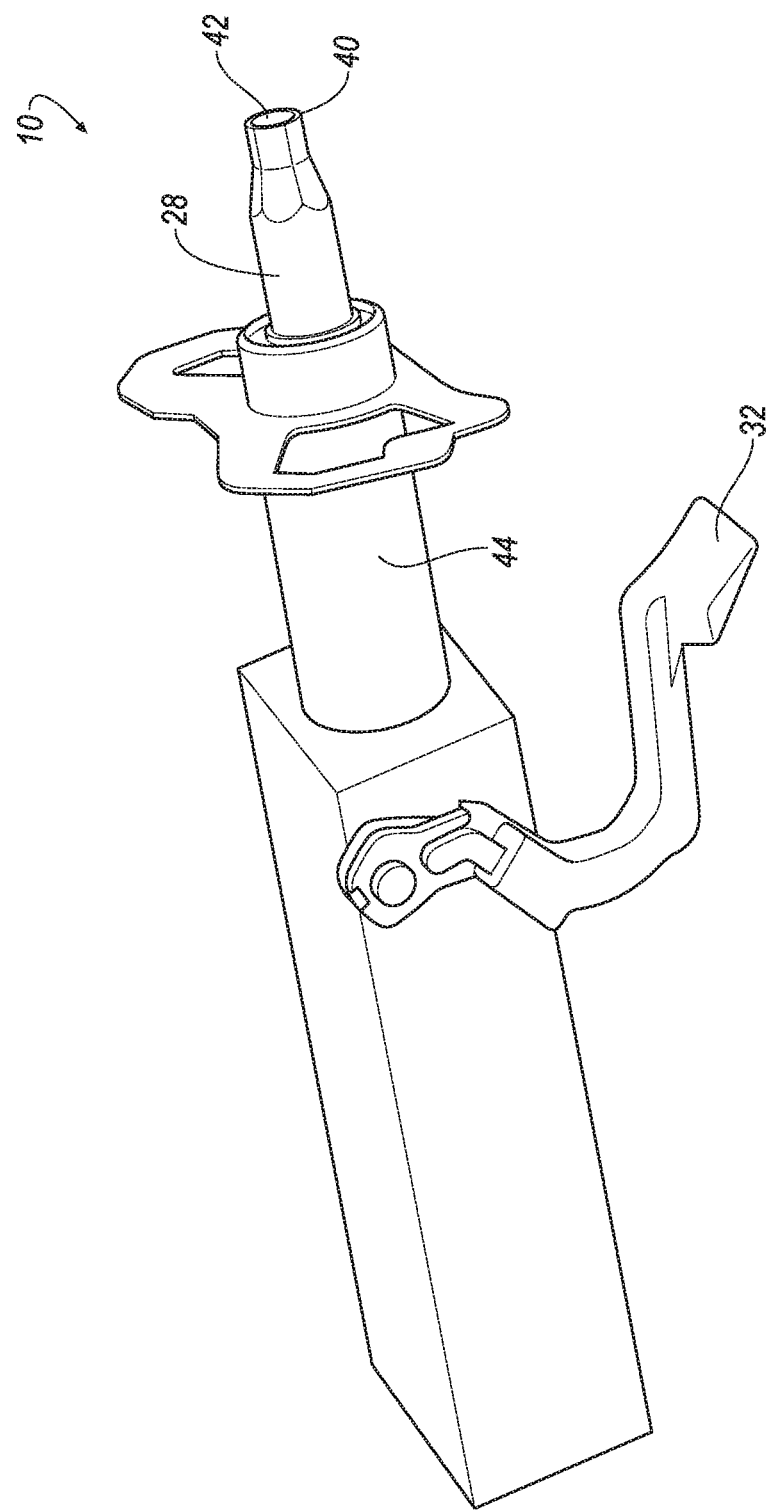
FIG. 2 is a perspective view of the steering column assembly.

A steering column assembly includes a first shaft and a second shaft telescopically engaged with the first shaft, a bore extending through the first shaft to the second shaft, and a plug disposed in and occluding the bore with the plug being resiliently expandable relative to the first shaft.

The plug may be a resiliently-expandable foam.

The plug may have a spherical shape.

A steering column assembly further includes splines disposed in the bore between the first and second shafts and elongated in a telescoping direction of the first and second shafts.

The first shaft may have an end spaced from the second shaft and the bore may extend from an opening at the end to an expanded section of the bore. The diameter of the bore at the opening may be smaller than a diameter of the bore at the expanded section, and the plug is compressible to the diameter of the bore at the opening.

The bore may be threaded at the opening.

The bore may include a reduced section between the expanded section and the second shaft. The diameter of the bore at the reduced section may be smaller than the diameter of the bore at the expanded section, the plug being in the expanded section.

The plug may be expandable to the diameter of the expanded section.

The steering column assembly may include splines disposed in the bore between the first and second shafts with the reduced section between the splines and the expanded section.

The plug may be expandable to the diameter of the expanded section.

The plug may be a resiliently-expandable foam.

The splines may be elongated along a telescoping direction of the first and second shafts.

The plug may be expandable to the diameter of the expanded section.

The plug may be a resiliently-expandable foam.

The steering column assembly may further include splines disposed in the bore between the first and second shafts with the expanded section between the splines and the end.

The splines may be elongated along a telescoping direction of the first and second shafts.

The steering column assembly may further include a steering wheel attaching to the first shaft with a fastener.

With reference to the Figures, wherein like numerals indicate like parts throughout the several views, a steering column assembly 10 for a vehicle 12 includes a first shaft 14 and a second shaft 16 telescopically engaged with the first shaft 14. A bore 18 extends through the first shaft 14 to the second shaft 16. A plug 20 is disposed in and occludes the bore 18. The plug 20 is resiliently expandable relative to the first shaft 14.

The plug 20 disposed in the bore 18 occludes the bore 18. The occlusion of the bore 18 prevents contaminants from falling into the first shaft 14 and second shaft 16 during assembly or service of the steering column assembly 10 in the vehicle 12. Because the plug 20 is resiliently expandable, the plug 20 can expand to the diameter of the bore 18 at any position in the bore 18, e.g., during and after installation of the plug 20. The plug 20 then is able to block any contaminants which may fall into the bore 18 from reaching a telescopic interface between the first shaft 14 and the second shaft 16 and interfering with the telescoping of the steering column assembly 10.

With reference to FIG. 1, the vehicle 12 may be of any type of passenger or commercial automobile such as a car, a truck, a sport utility vehicle 12, a crossover vehicle 12, a van, a minivan, a taxi, a bus, etc., or may be a watercraft, aircraft, etc. The vehicle 12 includes a passenger compartment 22 housing seats. A driver seat 26 is adjacent the steering column assembly 10. The vehicle 12 may include an instrument panel 24 disposed at the forward end 40 of the passenger compartment 22. The instrument panel 24 may extend 40 in a cross-vehicle 12 direction along the forward end 40 of the passenger compartment 22. The instrument panel 24 may face toward the front seats. The instrument panel 24 may include vehicle 12 controls, e.g., climate control switches, radio controls, speedometer, etc., and may support the steering column assembly 10.

The vehicle 12 may include a steering system for steering the vehicle 12. The steering system includes the steering column assembly 10 and other components between the steering column assembly 10 and wheels of the vehicle 12 for steering the wheels, e.g., rack-and-pinion components, steer-by-wire, etc.

The steering column assembly 10 may be supported by the instrument panel 24 in front of the driver seat 26. The steering column assembly 10 may include a steering column 28 and a steering wheel 30 attached to the steering column 28. The steering column 28 includes the first shaft 14 and the second shaft 16, as described below. The steering column 28 may extend 40 through the instrument panel 24 toward the driver seat 26. The steering column assembly 10 may include any other suitable components, e.g., steering-assist motors, wiring, sensors, etc.

The steering column assembly 10 may have a release handle 32 mechanically engaged with the first shaft 14 and the second shaft 16, e.g., with splines 34 described below. The release handle 32 may be moved between a locked position and a released position such that an operator of the vehicle 12 may move the steering wheel 30 to a desired driving position by telescoping the first shaft 14 and the second shaft 16. When the release handle 32 is in the locked position, the first shaft 14 and the second shaft 16 are not able to telescope within one another and the operator is not able to move the steering wheel 30. When the release handle 32 is in a released position, the first shaft 14 and the second shaft 16 can telescope toward or away from the driver seat 26 and the operator may move the steering wheel 30 to a desired driving position.

The steering wheel 30 may face the driver seat 26 and an operator may turn the steering wheel 30 to steer the wheels of the vehicle 12, i.e., rotation of the steering wheel 30 is transmitted to the wheels mechanically and/or electrically. The steering wheel 30, for example, may be a rigid ring, may have paddles, etc. The steering wheel 30 may be of any suitable material. the steering wheel 30 is attached to the steering column 28 with a fastener 36. In other words, the steering wheel 30 is attachable to and releasable from the steering column 28 with the fastener 36. The fastener 36 may, for example, extend 40 through the steering wheel 30 and engage the steering column 28. The steering wheel 30, for example, is attached to the first shaft 14.

The fastener 36, for example, may be a threaded fastener 36, e.g., screw, bolt, etc. Alternatively, the fastener 36 may be of any suitable type for releasably attaching the steering wheel 30 to the steering column 28. The fastener 36 may include a torque prevailing material, i.e., releasable epoxy, to releasably lock the fastener 36, i.e., to allow the fastener 36 to be removed by a service technician. The fastener 36 may be, for example, generally at the center of the steering wheel 30.

An airbag assembly 38 may be mounted to the steering wheel 30. The fastener 36 may be disposed between the airbag assembly 38 and the steering column 28. The airbag assembly 38 may be disposed and attached on the steering wheel 30 near a center of the steering wheel 30. As an example, the airbag assembly 38 may be removed from the steering wheel 30 to gain access to the fastener 36.

Figure 3:
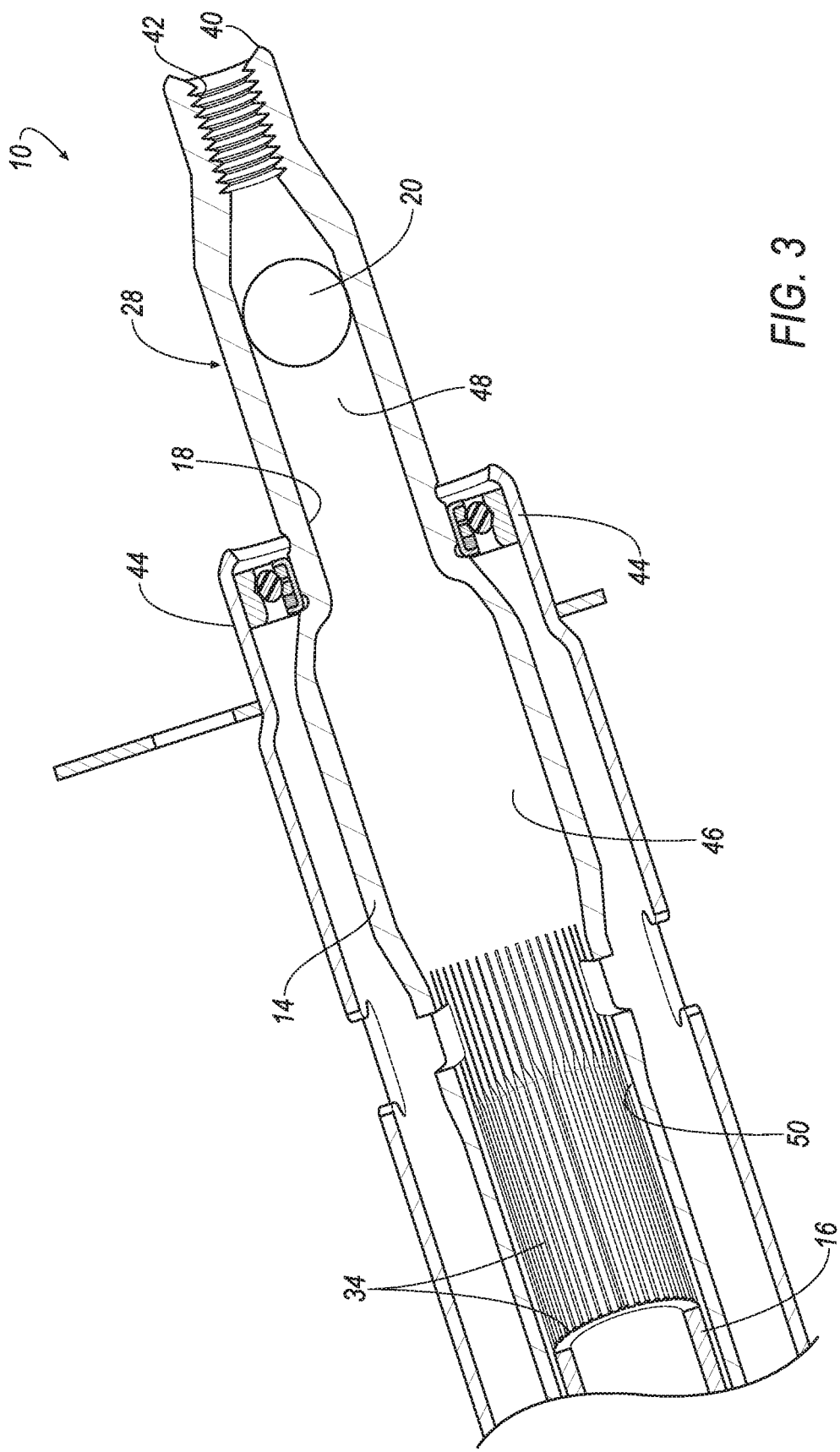
FIG. 3 is a cross-sectional view of the steering column assembly having a plug in a first position during installation of the plug.
Figure 4:
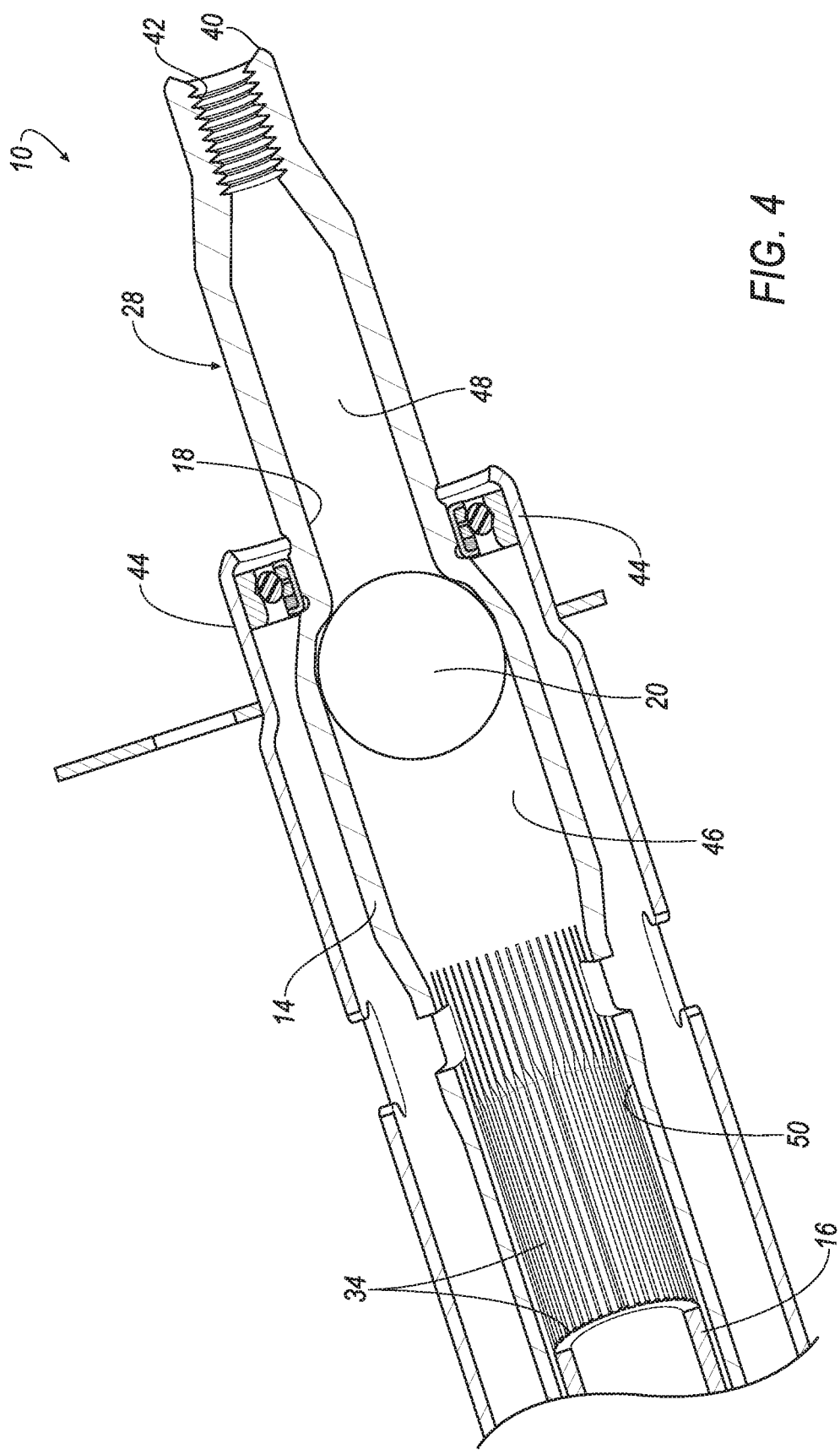
FIG. 4 is a cross-sectional view of the steering column assembly with the plug in an installed position.
Figure 5:
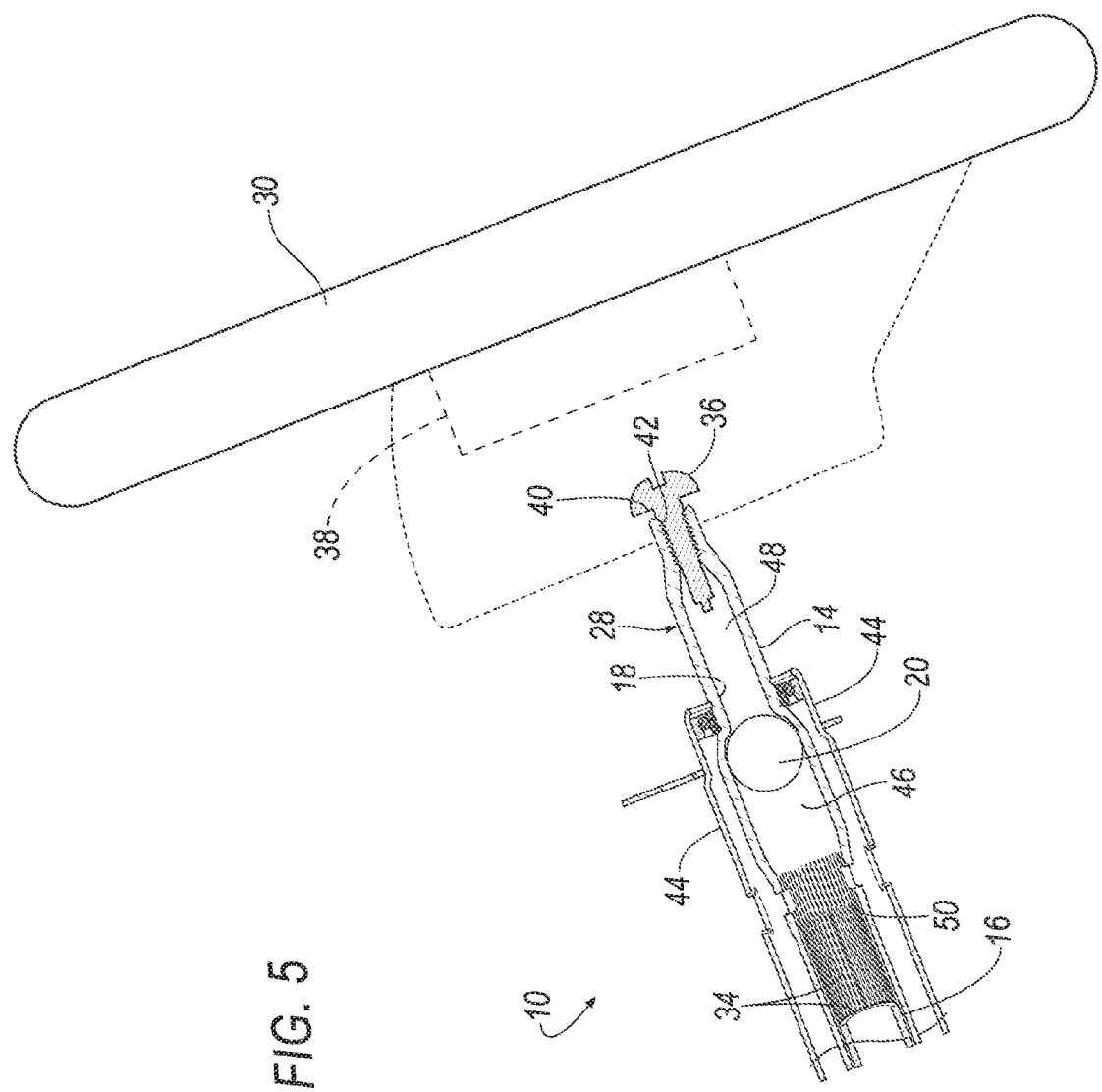
FIG. 5 is a cross-sectional view of the steering column assembly with a steering wheel attached to the assembly after the plug has been moved to the installed position.

With reference to FIGS. 3-5, the steering column assembly 10 includes the first shaft 14 and the second shaft 16. The first shaft 14 and the second shaft 16 may each have a generally cylindrical shape. The second shaft 16 may be telescopically engaged with the first shaft 14. In other words, one of the first shaft 14 and the second shaft 16 is telescopically received in the other of the first shaft 14 and the second shaft 16. The telescoping of the first shaft 14 with the second shaft 16 allows the steering wheel 30 to be moved toward or away from an operator sitting in the driver seat 26 of the vehicle 12.

The first shaft 14 may have an end 40 spaced from the second shaft 16. The first shaft 14 may define an opening 42 at the end 40. The steering wheel 30 may be attached to the first shaft 14 by the fastener 36 at the opening 42. The bore 18 may be threaded at the opening 42 to attach the steering wheel 30 to the first shaft 14 with the fastener 36.

The steering column assembly 10 may include a sheath 44 surrounding the first shaft 14 and the second shaft 16. The sheath 44 may extend 40 from the end 40 of the first shaft 14 to the and past the second shaft 16.

The bore 18 of the steering column assembly 10 extends through the first shaft 14 to the second shaft 16. The bore 18 may extend 40 from the opening 42 at the end 40 to an expanded section 46 of the bore 18. The diameter of the bore 18 at the opening 42 is smaller than the diameter of the bore 18 at the expanded section 46.

The bore 18 includes a neck section 48 joining the opening 42 to the expanded section 46. The diameter of the bore 18 at the neck section 48 may be greater than the diameter at the opening 42 but smaller than the diameter at the expanded section 46.

The bore 18 may include a reduced section 50 between the expanded section 46 and the second shaft 16. The diameter of the bore 18 at the reduced section 50 may be smaller than the diameter of the bore 18 at the expanded section 46.

With continued reference to FIGS. 3-5, the steering column assembly 10 may include a plurality of splines 34 disposed in the bore 18. The splines 34 may be between the first shaft 14 and the second shaft 16. The splines 34 are disposed on an outer surface of one of the first and second shafts 14, 16 and the inner surface of the other of the first and second shafts 14, 16. In the example in the figures, the splines 34 are on the inner surface of the first shaft 14 and an outer surface of the second shaft 16. The splines 34 are elongated in a telescoping direction of the first shaft 14 and the second shaft 16. The splines 34 may be disposed in the bore 18 with the expanded section 46 being between the splines 34 and the end 40. The reduced section 50 of the bore 18 may be between the splines 34 and the expanded section 46.

As previously discussed, the steering column assembly 10 includes the plug 20 disposed in the bore 18. The plug 20 may be a resiliently expandable material, i.e. a synthetic NBR/PVC rubber foam or any other resiliently expandable material, relative to the first shaft 14, e.g., the plug 20 may be resiliently compressed into the opening 42 and expand into the expanded section 46, as described below.

When installed in the bore 18, as shown in FIG. 5, the plug 20 may occlude the bore 18. In other words, the plug 20 completely fills the bore 18 by resiliently expanding to the diameter of the bore 18. The plug 20 may have a spherical shape. The plug 20 may be a resiliently-expandable foam material. The plug 20 may be of any type of expandable foam which would allow the expansion of the plug 20 to occlude the bore 18.

The plug 20 may be compressible to the diameter of the bore 18 at the opening 42. The plug 20 may be inserted into the bore 18 through the opening 42 in the first shaft 14. Using a long, narrow tool, i.e., a screw driver or pencil, the plug 20 may be pushed past the threads into the neck section 48 of the bore 18. Once inserted into the neck section 48, the plug 20 may expand to the diameter of the neck section 48. Using the long, narrow tool, the plug 20 may be pushed farther into the bore 18 and into the expanded section 46. The plug 20 may expand to the diameter of the expanded section 46 to occlude the bore 18. Because the diameter of the expanded section 46 is greater than the diameter of the reduced section 50, once expanded to the diameter of the expanded section 46, the plug 20 will not fall into the reduced section 50. The plug 20 will remain in the expanded section 46.

The plug 20 may be inserted into the bore 18 either during initial assembly of the steering column assembly 10 or during service of the steering column assembly 10. During assembly or service of the steering column assembly 10, contaminants, e.g., released torque prevailing material, may become dislodged from the fastener 36 and fall into the first shaft 14. With the plug 20 in the expanded section 46 and fully expanded to occlude the bore 18, the plug 20 prevents the contaminants from falling into the reduced section 50 or the splines 34 to prevent interference with telescoping caused by contaminants in the splines 34.

During service to the steering column assembly 10 that involves removal of the steering wheel 30, the plug 20 is inserted into the first shaft 14 after the steering wheel 30 is be removed. A service technician will have access to the opening 42 of the first shaft 14 after removal of the steering wheel 30. The plug 20 may then be compressed to the diameter of the opening 42. Using a long, narrow tool, i.e., a screw driver or a pencil, the plug 20 may be pushed through the opening 42 into the neck section 48. The plug 20 then expands to the diameter of the neck portion, as shown in FIG. 3. The long, narrow tool may then push the plug 20 farther into the bore 18 and into the expanded section 46. The plug 20 then expands to the diameter of the expanded section 46, as shown in FIG. 4. The plug 20 expands to occlude the bore 18 at the expanded section 46. The occluding stops contaminants from falling into the reduced section 50 and splines 34, e.g., when the fastener 36 is re-engaged with the first shaft 14 to attach the steering wheel 30. Once the plug 20 is deposited into the expanded section 46, the steering wheel 30 may be re-secured to the steering column 28 with a new fastener 36. The airbag assembly 38 will be reattached the steering wheel 30 and the vehicle 12 may operate as normal.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A steering column assembly comprising:
   a first shaft and a second shaft telescopically engaged with the first shaft;
   a bore extending through the first shaft to the second shaft;
   a plug disposed in and occluding the bore, the plug being resiliently expandable relative to the first shaft; and
   the first shaft having an end spaced from the second shaft and the bore extending from an opening at the end to an expanded section of the bore, the diameter of the bore at the opening being smaller than a diameter of the bore at the expanded section, and the plug is compressible to the diameter of the bore at the opening.

2. The steering column assembly of claim 1, wherein the plug is a resiliently-expandable foam.

3. The steering column assembly of claim 1, wherein the plug has a spherical shape.

4. The steering column assembly of claim 1, further comprising splines disposed in the bore between the first and second shafts and elongated in a telescoping direction of the first and second shafts.

5. The steering column assembly of claim 1, wherein the bore is threaded at the opening.

6. The steering column assembly of claim 1, wherein the bore includes a reduced section between the expanded section and the second shaft, the diameter of the bore at the reduced section being smaller than the diameter of the bore at the expanded section, the plug being in the expanded section.

7. The steering column assembly of claim 6, wherein the plug is expandable to the diameter of the expanded section.

8. The steering column assembly of claim 6, further comprising splines disposed in the bore between the first and second shafts with the reduced section between the splines and the expanded section.

9. The steering column assembly of claim 8, wherein the plug is expandable to the diameter of the expanded section.

10. The steering column assembly of claim 9, wherein the plug is a resiliently-expandable foam.

11. The steering column assembly of claim 8, wherein the splines are elongated along a telescoping direction of the first and second shafts.

12. The steering column assembly of claim 1, wherein the plug is expandable to the diameter of the expanded section.

13. The steering column assembly of claim 12, wherein the plug is a resiliently-expandable foam.

14. The steering column assembly of claim 1, further comprising splines disposed in the bore between the first and second shafts with the expanded section between the splines and the end.

15. The steering column assembly of claim 14, wherein the splines are elongated along a telescoping direction of the first and second shafts.

16. The steering column assembly of claim 1, further comprising a steering wheel attached to the first shaft with a fastener.

* * * * *